United States Patent [19]

Kuroda

[11] Patent Number: 5,112,526

[45] Date of Patent: May 12, 1992

[54] METHOD FOR MODIFYING THE SURFACE OF MICROCAPSULE

[75] Inventor: Jyuzo Kuroda, Yamatokooriyama, Japan

[73] Assignee: 501 Sakura Color Products Corporation, Osaka, Japan

[21] Appl. No.: 540,165

[22] Filed: Jun. 19, 1990

[30] Foreign Application Priority Data

Jun. 23, 1989 [JP] Japan .................. 1-161937

[51] Int. Cl.$^5$ .................. C08L 61/20; B01J 13/20; C09D 11/00; C07J 7/02

[52] U.S. Cl. .................. 252/363.5; 264/4.33; 264/4.7; 427/213.31; 427/213.34; 428/402.21; 252/357

[58] Field of Search .................. 264/4.3, 4.32, 4.33, 264/4.7; 428/402.2, 402.21; 427/213.31, 213.34; 252/357, 363.5

[56] References Cited

U.S. PATENT DOCUMENTS

| | | | |
|---|---|---|---|
| 1,923,178 | 8/1933 | Ulrich et al. .................. | 252/357 |
| 2,809,948 | 10/1957 | Hunter et al. .................. | 252/357 |
| 4,062,799 | 12/1977 | Matsukawa et al. .................. | 264/4.3 |
| 4,093,556 | 6/1978 | Wojciak .................. | 427/213.34 |
| 4,936,916 | 6/1990 | Shinmitsu et al. .................. | 264/4.7 X |

*Primary Examiner*—Robert L. Stoll
*Assistant Examiner*—John M. Covert
*Attorney, Agent, or Firm*—Larson and Taylor

[57] ABSTRACT

A method for modifying the surface of the microcapsule consisting of an outer layer composed of a urea-formaldehyde copolymer, a melamine-formaldehyde copolymer or a urea-melamine-formaldehyde terpolymer and an inner phase composed of hydrophobic organic components, the method comprises contacting the microcapsule with a water-immiscible organic solvent and at least one member selected from the group of compound of general formula (I)

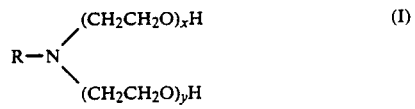

wherein R is an alkyl group having 8 to 22 carbon atoms; x and y are each a whole number not less than 0 and their sum is a whole number of not more than 60, provided that x and y cannot be simultaneously equal to 0.

6 Claims, No Drawings

METHOD FOR MODIFYING THE SURFACE OF MICROCAPSULE

FIELD OF THE INVENTION

The present invention relates to a method for modifying the surface of microcapsule consisting of an outer layer (shell) composed of a formaldehyde-containing copolymer and an inner phase (core material) composed of hydrophobic components.

The method of the present invention is particularly useful for modifying the surface of the outer layer of microcapsules enclosing a coloring material which is adapted to change color on increase or decrease of its temperature from ambient temperature to a desired temperature, microcapsules containing a color-forming agent for non-carbon copy paper, microcapsules containing perfumes, agricultural chemicals, curing components of adhesive systems and so on.

BACKGROUND OF THE INVENTION

There have been proposed a variety of methods for the manufacture of microcapsules for a broad range of uses such as those mentioned above. Representative are the method comprising the use of a urea-formaldehyde copolymer for the outer layer (Japanese Patent Publication No. 54-16949), the method comprising the use of a urea-formaldehyde copolymer or melamine-formaldehyde copolymer as the shell component (Japanese Kokai Patent Publication No. 62-1451), and the method comprising the use of a urea-formaldehyde copolymer, melamine-formaldehyde copolymer or urea-melamine-formaldehyde terpolymer for the outer layer (Japanese Kokai Patent Application No.63-134048).

However, since the surface of the shell structure of microcapsules manufactured by any of these methods is so strongly hydrophilic that they cannot be efficiently dispersed in an oil-soluble resin or an organic medium in which such an oil-soluble resin has been dissolved, with the result that these microcapsules are not suited for ink, coating composition and like applications.

In order to recover the microcapsules so manufactured in particulate form from an aqueous water-soluble polymer system in which they are dispersed, a spray-drying technique is generally employed but this technique involves the use of heat, resulting in an additional energy cost.

Another disadvantage of this technique is that the heat treatment tends to cause degradation of both the shell and inner material of the microcapsules.

Moreover, the production line employing the technique must be provided with a heating chamber for the heat treatment and this entails use of larger production equipment.

A still another drawback of the spray-drying technique is that a large amount of formaldehyde derived from the starting comonomer remains in the microcapsules manufactured and constitutes a source of unpleasant smell and presents a health hazard as well.

SUMMARY OF THE INVENTION

The inventor has conducted an extensive research to provide a method for overcoming or alleviating the above-mentioned problems and succeeded in modifying the surface of microcapsules from hydrophilic to lipophilic. The present invention has been accomplished on the basis of the above new findings.

The present invention provides a method for modifying the surface of the microcapsule consisting of an outer layer composed of a urea-formaldehyde copolymer, a melamine-formaldehyde copolymer or a urea-melamine-formaldehyde terpolymer and an inner phase composed of hydrophobic components, the method comprising contacting the microcapsule with a water-immiscible organic solvent and a compound of general formula (I)

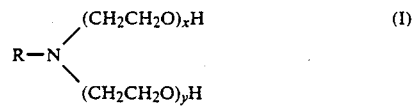

wherein R is an alkyl group having 8 to 22 carbon atoms; x and y are each a whole number not less than 0 and their sum is not more than 60, with the proviso that x and y are not simultaneously equal to 0.

DETAILED DESCRIPTION OF THE INVENTION

The compounds of general formula (I) to be used in the present invention, which are surfactants, include oxyethylenedodecylamine, polyoxyethylenedodecylamine, oxyethyleneoctadecylamine, polyoxyethyleneoctadecylamine and the like.

The water-immiscible organic solvents, to be used in the present invention include aliphatic hydrocarbons which may optionally be substituted and aromatic hydrocarbons which may optionally be substituted. Examples of the solvents are as follows:

Aliphatic hydrocarbons : hexane, cyclohexane, methylcyclohexane, ethyl-cyclohexane, heptane, methylene chloride, carbon disulfide, etc.

Aromatic hydrocarbons : benzene, toluene, xylene, chlorobenzene, diethylbenzene, tetralin, etc.

The microcapsules to which the method of this invention is applicable are those manufactured by conventional methods such as explained above and have a shell structure made of a copolymer comprising formaldehyde as a comonomer, such as urea-formaldehyde copolymer, melamine-formaldehyde copolymer, urea-melamine-formaldehyde terpolymer, etc.

A substance or substances to be enclosed in such shell structures are not particularly limited and include hydrophobic oily materials containing as active component colorant, perfume, agricultural chemical, curing component for an adhesive system, enzyme, pharmaceutical composition, foodstuff and the like.

The proportions of the respective components of the invention, based on one part by weight of compound (I), are 2 to 1,000 parts by weight, preferably 5 to 500 parts by weight, of the water-immiscible organic solvent and 1 to 500 parts by weight, preferably 2 to 200 parts by weight, of the microcapsules.

If the proportion of the organic solvent exceeds the above-mentioned maximum amount, the shell of the microcapsule may be destroyed or the encapsulated material tends to be extracted out. On the other hand, if the proportion of the organic solvent is less than the above-precipitated out to act only sparingly on the microcapsule surface, thus failing to form an adequate lipophilic film on the microcapsule wall. When the proportion of compound (I) is too low or the proportion of microcapsules is excessive, the formation of lipophilic layer on the surface of microcapsules becomes difficult.

The modification of the shell surface according to the present invention is conducted in the following manner. After the manufacture of microcapsules having a shell structure made of formaldehyde-containing copolymer by a conventional production process, the aqueous polymer system containing the microcapsules dispersed therein is mixed with the compound (I) and water-immiscible organic solvent with gentle stirring. If necessary, water may be added thereto during mixing. While the mixing temperature and time are not critical, they are generally in the range of ambient temperature to about 70° C. and about 5 to about 60 minutes.

The liquid phase formed by the above mixing procedure will separate, on termination of stirring, into a water (aqueous) layer and an oil (organic) layer and the microcapsules having lipophilic surface begin to migrate from the aqueous phase to the organic phase. As the liquid system is left to stand for about 5 minutes to about 2 hours, all the microcapsules are transferred into the organic phase. With the microcapsules thus moved into the organic layer, molecules of compound (I) cover the surface of microcapsules with their lipophilic ends oriented outwardly so that the surface of the shell which was initially hydrophilic is rendered lipophilic.

The microcapsules having a shell structure made of urea-formaldehyde copolymer, melamine-formaldehyde copolymer or urea-melamine-formaldehyde terpolymer, whose surface has thus been rendered lipophilic, are highly dispersible in an oil-soluble resin or an organic solvent in which such an oil-soluble resin has been dissolved and, therefore, can be advantageously used in oil inks (e.g. for gravure printing, silk-screen printing, etc.), coating compositions and other applications.

The microcapsules whose surface has thus been rendered lipophilic by the method of the present invention can be easily separated as discrete solid particles with a minimum of agglomerate by conventional filtration and drying procedures. The method is very economical in that, unlike the prior art, the liquid system containing the microcapsules need not be spray-dried. Furthermore, since the method is free from the problem of thermal degradation of the shell and core, it can be more advantageously applied to the microencapsulation of volatile or low heat-resistant inner phase substances such as perfumes, agricultural chemicals and so on.

In addition, the water-soluble formaldehyde released from the copolymer forming shell structure is hardly transferred to the organic layer, so that the amount of residual formaldehyde in microcapsules recovered from the organic layer is markedly reduced. Therefore, according to the method of the present invention, products of excellent quality with reduced unpleasant smell and improved safety can be obtained.

EXAMPLES

Examples are given below to illustrate the features and advantages of the invention in further detail. In these examples, all % and parts are by weight.

EXAMPLE 1

In 100 parts of a 5% aqueous solution of ethylenemaleic anhydride copolymer (trademark "EMA 31", product of Monsanto) were dissolved 6 parts of urea and 1 part of resorcin to give Solution A.

One part of crystal violet lactone, 2 parts of bisphenol A and 100 parts of myristic acid were heated together to give Solution B.

With Solution A maintained at 60° C., Solution B was added and the mixture was stirred in a homogenizer at 3,000 rpm for 5 minutes. The resultant emulsion was adjusted to pH 3.2 with a 20% aqueous solution of sodium hydroxide. While this mixture was held at 60° C., 16 parts of 37% formaldehyde were added and stirred. The mixture was further stirred gently for 2 hours, after which it was cooled to ambient temperature to give a dispersion of microcapsules.

One-hundred parts of the above dispersion was diluted with 100 parts of water to give Dispersion C. The average particle size of the microcapsules in Dispersion C was 7 $\mu$m.

Dispersion C was added to a solution containing 10 parts of oxyethylenedodecylamine (trademark "Naymeen L-201", product of Nippon Oil and Fats) in 200 parts of toluene and the mixture was stirred to give a uniform dispersion, which was then allowed to stand for 2 hours. Thereupon the dispersion separated into two layers, viz. a water layer and an oil (toluene) layer, with the microcapsules migrating from the water layer into the toluene layer. The water layer was removed using a separating funnel and the microcapsules dispersed in the toluene layer were recovered by filtration and dried to give 45 parts of thermochromic microcapsules having a urea-formaldehyde copolymer shell.

To 100 parts of toluene containing 30 parts of an oil-soluble acrylic resin were added 33 parts of the above microcapsules and the mixture was stirred in a homogenizer at 10,000 rpm for 3 minutes.

Using the above dispersion as thermochromic acrylate-base ink, paper and polyester film were printed by means of a gravure printing press. As a result, printed layers with a smooth surface were obtained. The printed portions were blue at ambient temperature but became colorless when heated to 50° C. or higher.

EXAMPLE 2

A microcapsule dispersion was prepared in the same manner as in Example 1 except that polystyrene-sulfonic acid (mol. wt. 500,000) was used in lieu of ethylene-maleic anhydride copolymer.

In 200 parts of toluene was dissolved 6 parts of oxyethylenedodecylamine (same as used in Example 1) and while the solution was gently stirred, 100 parts of the microcapsule dispersion was added, followed by addition of 1,000 parts of water. The mixture was then allowed to stand for 30 minutes, whereupon the microcapsules were transferred from the water layer to the toluene layer. Then, the water layer was removed using a separating funnel and the organic layer was filtered and dried to give 40 parts of thermochromic microcapsules.

The microcapsules were mixed with 100 parts of liquid epoxy resin (trademark "Epikote 828", product of Yuka Shell Epoxy) and 2 parts of silicon dioxide (trademark "Aerosil R 972", product of Japan Aerosil) with stirring to give an ink for silk-screen printing. To 50 parts of the ink was added 15 parts of polyamideamine (trademark "Sanmide X-2000", product of Sanwa Chemical) and using a 200-mesh silk screen, sheet glass was printed and heated at 120° C. for 30 minutes for curing. The printed layer was very smooth in surface texture and there was no clogging of the screen. The printed portion was colorless at a temperature of 50° C. for higher but was blue at lower temperatures.

EXAMPLE 3

In 100 parts of the microcapsule dispersion prepared in Example 2 was dissolved 20 parts of polyoxyethylenedodecylamine (trademark "Naymeen L-202", product of Nippon Oil and Fats).

The solution was added slowly to 150 parts of xylene at room temperature with stirring. After addition of 800 parts of water, the mixture was allowed to stand for 1 hour, whereupon the microcapsule particles were transferred into the xylene layer. After removal of the water layer, the organic layer was filtered and dried to give 40 parts of microcapsules. Then, as in Example 1, the microcapsules were treated to provide an ink for gravure printing.

Using a gravure printing press, paper and polyester film were printed with the ink to give prints which were very smooth in surface texture. The prints were colorless at 50° C. and higher temperatures but were blue at lower temperatures.

EXAMPLE 4

The procedure of Example 2 was repeated except that 5 parts of polyoxyethyleneoctadecylamine (trademark "Naymeen S-215", product of Nippon Oil and Fats) was used in lieu of oxyethylenedodecylamine to give 45 parts of microcapsule particles.

Then, also in the same manner as Example 2, an ink for silk-screen printing was prepared and a white ceramic plate was printed with the ink using a 200-mesh silk screen. The resulting print was very smooth in surface texture and there was no clogging of the silk screen. The print showed a well-defined change of color at 50° C. (blue in the lower temperature range and colorless in the higher temperature range).

EXAMPLE 5

The procedure of Example 1 was repeated except that 250 parts of tertiary fatty acid monoglycidyl ester (trademark "Cardura E-10", product of Yuka Shell Epoxy Co.) was used in lieu of 200 parts of toluene to give 45 parts of microcapsule particles. Forty-five parts of the microcapsules were mixed with 100 parts of liquid epoxy resin (the same as used in Example 2) and 1.5 parts of silicon dioxide (the same as used in Example 2) with stirring to give an ink for silk-screen printing. To 50 parts of this ink was added 12 parts of polyamideamine (the same as used in Example 2) and a white ceramic mug was printed with the mixture and heat-treated at 120° C. for 30 minutes for curing. The resulting print was very smooth in surface texture and there was no clogging of the silk screen. When boiling water was poured into the ceramic mug, the print changed color from blue to colorless and returned to the original blue color upon cooling.

EXAMPLE 6

The procedure of Example 1 was repeated except that a solution of 4 parts of 3-(N-cyclohexyl-N-methylamino)-6-methyl-7-anilinofluoran in 96 parts of an aromatic solvent (trademark "Hysol SAS 296", product of Nippon Oil Company) was used in lieu of Solution B to give a microcapsule dispersion.

To 100 parts of the dispersion was added 200 parts of water and the mixture was slowly added to 300 parts of benzene containing 10 parts of polyoxyethyleneoctadecylamine (the same as used in Example 4) at room temperature with gentle stirring. The mixture was then allowed to stand for 1 hour, whereupon the microcapsules were transferred into the benzene layer. After removal of the aqueous layer, the organic layer was filtered and dried to give 40 parts of microcapsule particles.

Using the microcapsule particles, an acrylic resin-based ink was prepared in the same manner as Example 1 and paper was coated with the ink by means of a bar coater. The coated paper was placed on the receiving sheet of a commercial carbonless copy paper and a figure was written with a ball-point pen. As a result, a sharp black image was reproduced on the receiving sheet.

COMPARATIVE EXAMPLE 1

The microcapsule dispersion obtained in the same manner as in Example 1 was spray-dried with a spray drier (trademark "Mobile Minor", product of Ashizawa Niro Atomizer) to give microcapsule. Then, using a homogenizer as in Example 1, 33 parts of the microcapsule were mixed with 100 parts of toluene in which 30 parts of acrylic resin had been dissolved. Using the resulting ink, printing was carried out with a gravure printing press. However, the printing plate was clogged with the microcapsules and printing could not be continued.

COMPARATIVE EXAMPLE 2

The microcapsule dispersion obtained in the same manner as in Example 2 was treated in the same manner as Comparative Example 1 to give microcapsule particles. Using the particles as an ink component for silk screen printing, printing was carried out in the same manner as Example 2. However, the screen was plugged with agglomerated microcapsules so that no satisfactory print could be obtained.

COMPARATVE EXAMPLE 3

The microcapsule dispersion obtained in the same manner as in Example 1 was spray-dried in the same manner as Comparative Example 1 to 9ive microcapsules. Forty-five parts of the microcapsules were mixed with 100 parts of liquid epoxy resin (the same as used in Example 2), 1.5 parts of silicon dioxide (the same as used in Example 2) and 5 parts of tertiary fatty acid monoglycidyl ester (the same as used in Example 5) to prepare an ink for silk-screen printing. Using the ink, silk-screen printing was carried out in the same manner as Example 5. As a result, the printed surface was coarse and grainy. Moreover, the screen was clogged.

I claim:

1. A method for modifying the surface of the microcapsule consisting of an outer layer composed of a urea-formaldehyde copolymer, a melamine-formaldehyde copolymer or a urea-melamine-formaldehyde terpolymer and an inner phase composed of hydrophobic organic components, the method comprises contacting the microcapsule with a water-immiscible organic solvent and at least one member selected from the group of compound of general formula (I)

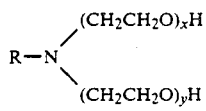

wherein R is an alkyl group having 8 to 22 carbon atoms; x and y are each a whole number not less than 0 and their sum is a whole number of not more than 60, provided that x and y cannot be simultaneously equal to 0.

2. The method of claim 1 wherein the compound of general formula (I) is at least one of oxyethylene-dodecylamine, polyoxyethylenedodecylamine, oxyethylene-octadecylamine and polyoxyethyleneoctadecylamine.

3. The method of claim 1 wherein the water-immiscible organic solvent is at least one member selected from the group consisting of aliphatic solvents and aromatic solvents.

4. The method of claim 3 wherein the water-immiscible organic solvent is at least one of hexane, cyclohexane, methylcyclohexane, ethylcyclohexane, heptane, methylene chloride, carbon disulfide, benzene, toluene, xylene, chlorobenzene, diethylbenzene and tetralin.

5. The method of claim 1 which is carried out using 2 to 1,000 parts by weight of the water-immiscible organic solvent and 1 to 500 parts by weight of the microcapsules based on one part by weight of the compound of general formula (I).

6. The method of claim 5 which is carried out using 5 to 500 parts by weight of the water-immiscible organic solvent and 2 to 200 parts by weight of the microcapsules based on one part by weight of the compound of general formula (I).

* * * * *